(12) United States Patent
Jeyaseelan et al.

(10) Patent No.: US 8,934,925 B2
(45) Date of Patent: Jan. 13, 2015

(54) MOBILE MESSAGING MESSAGE NOTIFICATIONS PROCESSING

(75) Inventors: Thomas Anand Jeyaseelan, Kirkland, WA (US); Jianfeng Yan, Shanghai (CN); Suresh Parameshwar, Hyderabad (IN); Zhou Xiang, Shanghai (CN); Sridhar Srinivasan, Shanghai (CN); Keizo Fujiwara, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/905,281

(22) Filed: Oct. 15, 2010

(65) Prior Publication Data

US 2012/0094637 A1    Apr. 19, 2012

(51) Int. Cl.
*H04W 68/00* (2009.01)
*H04W 4/12* (2009.01)
*H04L 12/58* (2006.01)

(52) U.S. Cl.
CPC ............. *H04W 4/12* (2013.01); *H04L 12/5805* (2013.01); *H04L 51/02* (2013.01); *H04L 12/583* (2013.01); *H04L 12/5895* (2013.01); *H04L 51/063* (2013.01)
USPC .......................... 455/458; 455/466; 455/412.2

(58) Field of Classification Search
CPC ......... H04W 4/14; H04W 4/12; H04W 68/00; H04W 68/02; H04W 68/025; H04L 29/06; H04L 29/08072; H04L 29/06095
USPC ............................... 455/412.2, 457–458, 466; 709/204–206; 705/7.13–7.19; 707/769
See application file for complete search history.

(56) References Cited

U.S. PATENT DOCUMENTS

| | | | |
|---|---|---|---|
| 2004/0225637 A1* | 11/2004 | Heinzel et al. | 707/1 |
| 2007/0214271 A1 | 9/2007 | Griffin et al. | |
| 2008/0195454 A1* | 8/2008 | Lee | 705/8 |
| 2008/0195705 A1* | 8/2008 | Lee | 709/204 |
| 2009/0252159 A1* | 10/2009 | Lawson et al. | 370/352 |
| 2009/0254670 A1* | 10/2009 | Kim et al. | 709/230 |
| 2009/0276500 A1* | 11/2009 | Karmarkar | 709/206 |
| 2010/0004005 A1* | 1/2010 | Pereira et al. | 455/457 |
| 2010/0004971 A1* | 1/2010 | Lee et al. | 705/8 |
| 2010/0010864 A1* | 1/2010 | Lee et al. | 705/9 |
| 2010/0054220 A1 | 3/2010 | Bischinger et al. | |

(Continued)

OTHER PUBLICATIONS

Now SMS/MMS Gateway 2007 Edition—Published Date: Jun. 27, 2007 http://www.2.nowms.com/download/nowsms2007.pdf.

(Continued)

*Primary Examiner* — Nathan Taylor
(74) *Attorney, Agent, or Firm* — Bryan Webster; Kate Drakos; Micky Minhas (57) ABSTRACT

Described is a pipeline for handling notification messages sent to a mobile messaging message (e.g., SMS or SMTP) recipient, and handling a reply to that notification message, including correlating the notification message with the reply. An engine receives a notification message, and for a notification message to which a reply is possible, maintains state data for use in correlating a received reply with the notification message. The state data includes metadata that indicates that text or code data is expected in any reply. For a reply providing code data, the engine calls a selected URL corresponding to the code. To facilitate message delivery, the engine may format the notification message, including shortening a URL of the message, and/or splitting a longer notification message into shorter notification messages.

20 Claims, 6 Drawing Sheets

(56) References Cited

U.S. PATENT DOCUMENTS

| | | | |
|---|---|---|---|
| 2010/0293334 A1* | 11/2010 | Xun et al. | 711/129 |
| 2011/0041140 A1* | 2/2011 | Harm et al. | 719/318 |
| 2011/0055248 A1* | 3/2011 | Consuegra et al. | 707/769 |
| 2011/0055249 A1* | 3/2011 | Consuegra et al. | 707/769 |
| 2011/0055331 A1* | 3/2011 | Adelman et al. | 709/206 |
| 2011/0055562 A1* | 3/2011 | Adelman et al. | 713/168 |
| 2011/0055911 A1* | 3/2011 | Adelman et al. | 726/7 |
| 2011/0060801 A1* | 3/2011 | Virk et al. | 709/206 |
| 2011/0136516 A1* | 6/2011 | Ellis | 455/458 |
| 2011/0161291 A1* | 6/2011 | Taleck et al. | 707/622 |
| 2011/0161409 A1* | 6/2011 | Nair et al. | 709/203 |
| 2011/0161723 A1* | 6/2011 | Taleck et al. | 714/4.11 |
| 2011/0170505 A1* | 7/2011 | Rajasekar et al. | 370/329 |
| 2011/0264745 A1* | 10/2011 | Ferlitsch | 709/205 |
| 2011/0283172 A1* | 11/2011 | Berger et al. | 715/202 |

OTHER PUBLICATIONS

Tip: Use XML to Send SMS Messages—Published Date: Jun. 7, 2004 http://www.ibm.com/developerworks/xml/library/x-tipsms1.html.

API—Published Date Unknown, Retrieved Date: Mar. 30, 2010 http://wiki.developers.facebook.com/index.php/API.

REST API—Introduction—Published Date Unknown, Retrieved Date: Mar. 30, 2010 http://docs.ribbit.com/rest-api-docs-introduction.

API Docs—Messages—Published Date Unknown, Retrieved Date: Mar. 30, 2010 http://docs.ribbit.com/rest-api-docs-message.

Ozeki NG SMS Gateway—Product Guide—Published Date Unknown, Retrieved Date: Mar. 30, 2010 http://www.ozekisms.com/index.php?ow_page_number=223.

* cited by examiner

MOBILE MESSAGING MESSAGE NOTIFICATIONS PROCESSING

BACKGROUND

Mobile messaging messages, including SMS (Short Message Service) messages, MMS (Multimedia Messaging Service) messages, and mobile email messages, are relatively difficult to deliver to users. In general, this is because users use a wide variety of mobile carriers. Sending and receiving mobile messaging messages to and from users involves a thorough understanding of the carrier-specific details of delivery. Further, users in different markets use different technologies to receive mobile messaging messages; for example, in Japan, users receive mobile messaging messages as mobile e-mail messages.

In many markets, carriers demand the ability to respond to mobile messaging messages. However, interaction with users that involves responding to such messages sent from them is often a difficult problem. As a result, users cannot perform actions on such messages, such as initiating activities or performing actions such as accepting a request or adding a comment in response to a message. In addition to the above-described difficulties, message delivery also needs to honor privacy and security requirements.

Reaching users via their mobile devices is valuable in many scenarios. Any improvement in mobile messaging technology is thus desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a pipeline for handling notification messages directed toward a mobile message (e.g., SMS, MMS or SMTP) recipient, and handling a reply to that notification message, including correlating the notification message with the reply. In one aspect, an engine receives a notification message directed towards a mobile recipient, e.g., via a declarative API. The engine accesses a carrier-related data store to determine information corresponding to a mobile address of the mobile recipient. For a notification message to which a reply is possible, the engine maintains state data for use in correlating a received reply with the notification message.

In one aspect, the state data includes metadata that indicates that text data is expected in any reply to the notification message. When the engine receives a reply including text data, the engine accesses the state data to correlate the reply with the notification message, and returns text corresponding to the reply to a REST API service, which may decide to send the reply to a sender of the notification message.

In one aspect, the state data includes metadata that indicates that code data is expected in any reply to the notification message. When the engine receives a reply including such code data, the engine accesses the state data to correlate the reply with the notification message, and performs an action based upon the code data. For example, the code data may correspond to a selected URL of a plurality of URLs, and the engine performs the action by calling the selected URL. The code data may include a locale-specific code value, and/or a locale-agnostic code value. As will be understood, the locale-specific code keeps the reply semantics relevant to the market of the SMS participant, while the agnostic value keeps the API processing system uncoupled from the details that differ from locale to locale (such as the locale code).

To facilitate message delivery, the engine may format the notification message for the recipient. Formatting may include shortening at least one URL of the message into data representative of that URL (e.g., a short URL), and/or splitting the notification message into a plurality of shorter notification messages.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards processing mobile messaging messages that are related to notifications, such as a notification sent via a notifications platform as generally described in U.S. patent application Ser. No. 12/816,402, assigned to the assignee of the present application and hereby incorporated by reference. To this end, a mobile messaging message pipeline provides a mechanism to describe a mobile messaging message in terms of an outgoing message being transported, along with any possible responses that are permitted from the user. Each response may be associated with a call to a service that acts on the user's behalf to perform an initiated action and return a message the user. Note that as described herein, mobile messaging messages need not be simple one-way text messages, and instead may contain other information, including, for example, the ability to reply to a mobile messaging message or other notification (e.g., add a comment to a notification), and/or the ability to respond in a certain way (e.g., to accept or reject an invitation notification). Mobile messaging messages also may contain images and other non-textual data.

In one implementation, the pipeline provides an API that describes an outbound message that needs to be delivered to a user, along with information corresponding to any responses that the outbound message permits. Permitted responses include a text response in free text, or a coded response in code. The code may be described with a locale-specific code and a locale-agnostic code, allowing the pipeline to support coded actions with code values specific to a locale, thereby making the pipeline more relevant to the receiving user's market. The pipeline maintains corresponding information that may be used to re-associate/reconcile any response with the outgoing message's data.

It should be understood that any of the examples herein are non-limiting. As one example, in one implementation, the mobile messaging pipeline couples to a notifications platform as generally described in the aforementioned U.S. patent application Ser. No. 12/816,402; however other implementations and uses of the technology described herein are feasible. Moreover, while SMS is used as an example of mobile messaging, the technology is not limited to SMS; further, mobile messages need not necessarily be sent from a "mobile" device. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data communication in general.

Figure 1:
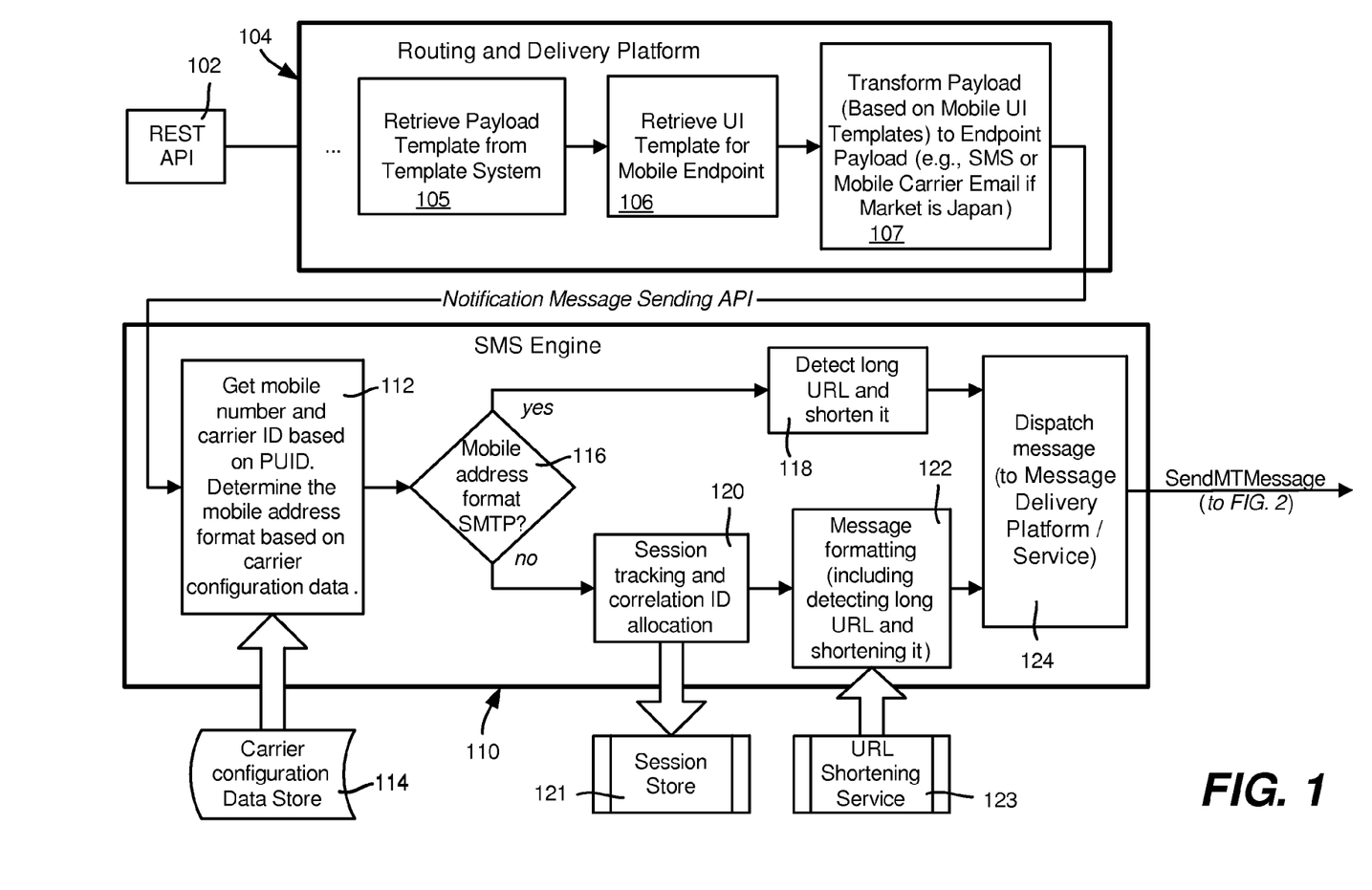
FIGS. 1 and 2 comprise a representation of an example mobile messaging message processing pipeline that processes an outgoing notification related to a mobile messaging message.
Figure 2:
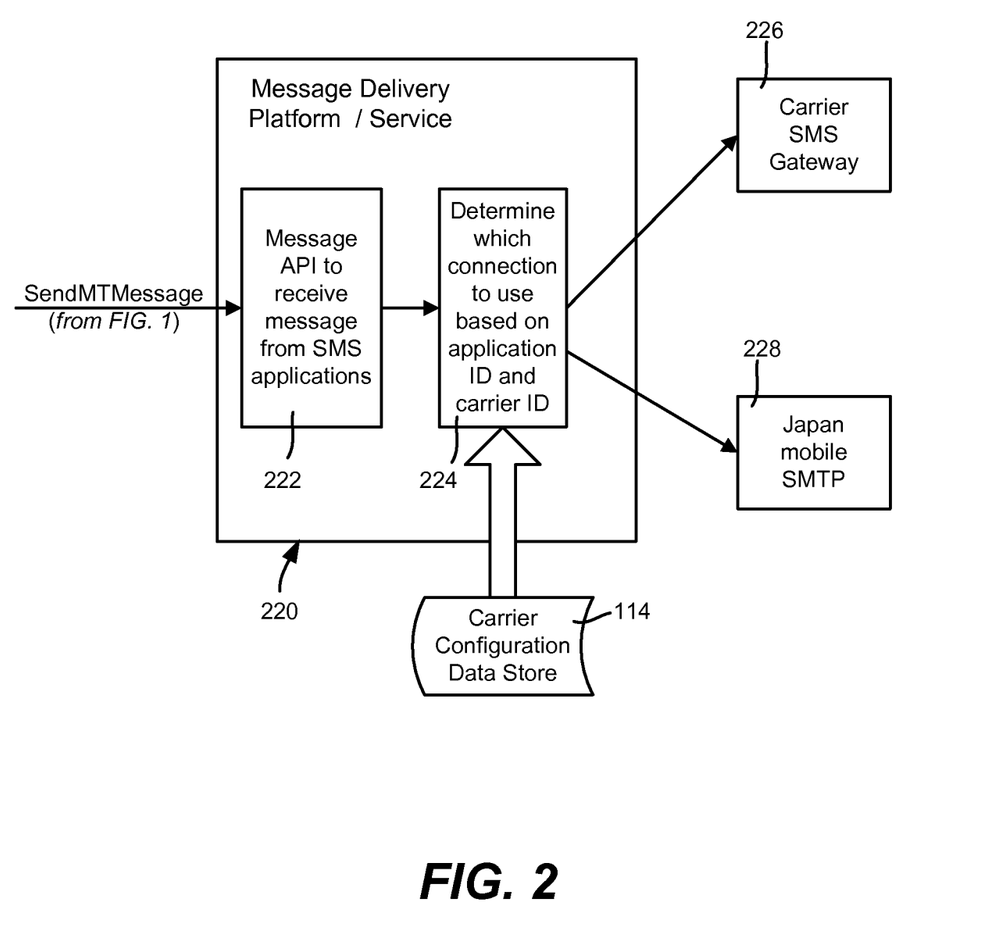

FIGS. 1 and 2 comprise a block diagram including components and/or logic representing the outbound message flow of one implementation of the mobile messaging message pipeline; (note that the inbound aspects are generally described below with reference to FIG. 3). In FIG. 1, a REST (representational state transfer) API 102 provides message data to a routing and delivery platform 104, such as described in the aforementioned U.S. patent application Ser. No. 12/816,402. The routing and delivery platform 104 transforms the message payload as appropriate for mobile messaging message sending, e.g., according to a payload template and UI template as generally represented in FIG. 1 via blocks 105-107. For example, the routing and delivery platform 104 receives notification message metadata and transforms the metadata into an SMS message or mobile carrier email, then sends it to a mobile messaging message engine 110 (e.g., implemented as a web service). Note that the transformation may be from one format to another, e.g., a user may use email to send a message to a recipient who has specified that the message be received as a mobile messaging message on a mobile device endpoint.

To provide the message to the engine 110, a REST API may be provided for an SMS message or the like, or a mobile carrier email message may be provided, e.g., via an HTTP Post method. When processing the message for delivery, if a registered user identifier (e.g., a Windows® Live/Passport Unique ID, or PUID) is provided, the mobile messaging message engine 110 of the pipeline resolves the provided user's identifier into the user's preferred mobile address. If only a mobile address is provided, the mobile messaging message engine 110 may treat the recipient's mobile address as an email format.

The table below summarizes example fields that may be related to the outbound message, e.g., from the caller:

| Field | Description |
| --- | --- |
| ApplicationName | Application name of the caller, e.g., SNNotification. The caller gets the application name assigned when on-boarding the notification outbound. |
| Id | Identifier for the request, e.g., a GUID string used to track the unique request from caller. |

-continued

| Field | Description |
| --- | --- |
| Puid | The PUID (or other registered user identifier) of the recipient. If the notification is sent to a user with a registered phone number, caller passes the PUID in. |
| MobileAddress | The mobile address of recipient. If the notification is sent to a non-registered user, caller passes the mobile address in, e.g., in the following format from caller: Email format, "smtp:[email address]", e.g. smtp:user@carrier.jp |
| Locale | Locale information of the notification message |
| Expiry | Expiry date and time of current notification message. If user replies after the expiry time, the response to the notification is treated as invalid. For example, a request may not be kept more than 30 days. |
| Scenario | Scenario value of the notification message, e.g. invite or comments. |
| Message | Message body to be sent (utf-8 encoded). |
| Oneway | Specifies whether the notification message expects user's response. If the value is set to false, the caller needs to specify the Actions field, which is used for inbound handling. |
| ServiceEndpoint | The global service endpoint that the engine calls when receiving user's response. If the action has a corresponding ServiceEndpoint defined, that ServiceEndpoint overrides the global one. |
| Context | The context data, which is passed to service endpoint for inbound design. |
| Actions | Specifies the expected actions from the inbound SMS |
| OnError | Specifies Error handling service endpoint |

As represented by block 112 accessing a carrier configuration data store 114 (e.g., a file), the engine 110 is able to retrieve the user's mobile carrier data and deliver the message according to the characteristics of the user's mobile provider (block 116). For example, if a PUID is received in a Windows® Live environment, the mobile messaging message engine 110 retrieves the recipient's mobile address. Note that the configuration data store 114 maintains information on which application has deployed in which carrier, along with the connection protocol for the application to that carrier, connection information, and short code-related information. In one implementation, this includes support for the Japanese mobile e-mail SMTP (Simple Mail Transfer Protocol) system. In order to determine the correct format of the mobile address, the mobile messaging message engine 110 parses the carrier configuration files for non-Japan carriers. If the mobile phone is from a Japanese carrier, the mobile messaging message engine 110 treats the format of the mobile address as an SMTP address.

Based on the mobile address format, the mobile messaging message engine 110 includes various logic, e.g., when the mobile address is of phone format (SMS), the mobile messaging message engine 110 stores (via a session tracking and correlation identifier allocation component 120) message data in conjunction with an allocated correlation identifier in a session store 121. In one implementation, the App ID, Correlation identifier and mobile address identify one session. The following table exemplifies other message-related data that may be maintained in the session store 121:

| Field | Description |
| --- | --- |
| ApplicationName | Application name of the caller, e.g., SNNotification. |
| Id | Identifier for the request, e.g., a GUID string is used to track the unique request. |
| Locale | Locale information of the notification message. |
| Expiry | The expiry time of current request context. |
| Scenario | Scenario value of the notification message. |
| ServiceEndpoint | The service endpoint that mobile messaging message |

-continued

| Field | Description |
|---|---|
| | engine will call when receiving user's response. |
| Context | The context data, which is passed to SN API for inbound design. |
| Actions | Specifies the expected actions from the inbound SMS |
| OnError | Specifies Error handling if no action matches the expected actions. |

The mobile messaging message engine 110 engine also may perform message formatting (block 122), e.g., if the notification mobile messaging message is longer than the maximum length per message supported by the carrier. More particularly, in one implementation, the message may be longer than the character limit of one SMS message, and thus the message is split. To this end, the mobile messaging message engine 110 gets the maximum length of a message that is supported by the carrier, based on the recipient's carrier ID. There are two maximum length of message values configured for each carrier, maximum DefaultAlphabet length and maximum Unicode length. The mobile messaging message engine 110 parses any long message to determine whether there is a Unicode character inside the message, and if so, the mobile messaging message engine splits the long message, using the maximum Unicode length as the reference for splitting, otherwise using the DefaultAlphabet length as the reference. The number of message splits may be limited, e.g., any part of a long message that cannot fit within three messages may be truncated.

Note that there are different aspects of message formatting, including message splitting and URL shortening; (other message formatting may be performed). If the message will be sent through SMTP, the mobile messaging message engine 110 only performs URL shortening, not message splitting.

With respect to URL shortening, the mobile messaging message engine 110 parses the message and locates any URL inside the message. If present, and depending on the length of the original URL, the mobile messaging message engine 110 decides whether to shorten the URL. There are two different configuration values of URL upper bound length, corresponding to mobile carrier email and SMS. If the original URL length is longer than the URL upper bound length, the mobile messaging message engine 110 calls a URL shortening service 123 to shorten it, and replaces the original URL with a shortened URL in the message. Note that the shortening service basically substitutes an identifier (e.g., an alias of the URL which itself is a URL) into the message content for the URL, which may be converted back to the original URL as needed; (collisions are not allowed). When the mobile address is of email format (mobile carrier email), the mobile messaging message engine 110 performs URL shortening (block 118) as appropriate.

Once formatted as appropriate, the mobile messaging message engine 110 (via block 124) passes the message to a message delivery platform/service 220 (FIG. 2), e.g., via a SendMTMessage API or the like (where "MT" refers to mobile terminated), which may include the following example fields:

| Field | Type | Comment |
|---|---|---|
| AppId | Int | The AppId may be one value for a social notification message, another for a different type of message. |
| CategoryId | Int | Need not be used; if not, pass null |
| | | value. |
| RecevierMobileAddress | String | The recipient's mobile address (usually a phone number, but may be an email address) Format of mobile address is one of following<br>1. Number format "+[country code][phone number]", e.g. +14251234545<br>2. Email format, "smtp:[email address]", e.g. smtp:user@carrier.jp |
| Body | String | The message body |
| AppCorrelationId | Int | The application-provided correlation identifier<br>Default = 0<br>Has to be >=0, can't be empty |
| Encoding | Int | DefaultAlphabet = 1, Unicode = 2<br>If it is Null, DefaultAlphabet will be used. Other value, return EncodingError |

As represented in FIG. 2, the message delivery platform/service 220, which includes the message API 222 for receiving the message, may access the carrier configuration data store and determine which connection to use (block 224) based on the application ID and the carrier ID. Note that block 224 also may format the short codes (the "from" address) based on the correlation identifier and the application ID. Based on the determination, the message is sent to the appropriate gateway 226 or 228.

The mobile messaging message engine 110 gets back a delivery result from the message delivery platform/service 220, e.g., through an API ReceiveMTResult( ), which may be used for any desired purpose. For example, the result may be used to determine success rate. The following data may be returned:

| Field | Data Type | Comments |
|---|---|---|
| LogicalMessageID | String | To identify a user session internally between Engine and application<br>The actual LogicalMessageID Engine generated/or inherited from the application and return it to the application. |
| Status Code | Int | 0 - Message is sent successfully (Status = true)<br>1 - Message is partially sent, split messages (Status = false)<br>2 - carrier invalid (status = false)<br>3 - target mobile address is invalid (status = false)<br>. . . |
| Status Message | String | |

As can be seen, the pipeline exposes a declarative API to send and receive mobile messaging messages. The API provides a property to set the outgoing message content, e.g., in UNICODE, and the pipeline ensures that the correct delivery encoding is used to support the characters. Long URLs may be automatically converted to a smaller URL or the like, and messages may be split.

The API provides a structure to describe the responses that are supported for the message, including text responses and coded responses. Messages that support a response are automatically saved in a state server and associated with an identifier (op code). When delivered to the user, the op code is the number that the user responds to if electing to respond. The pipeline automatically listens to this op code and converts the user's mobile number to an identifier (e.g., PUID) and invokes the REST API endpoint registered for the response. The API includes the REST API endpoint and any additional headers required to invoke the endpoint. Note that as this information is part of the API used to call the mobile messaging message delivery pipeline, the pipeline has the information it needs to call the incoming REST endpoint without having any preconfigured information.

Figure 3:
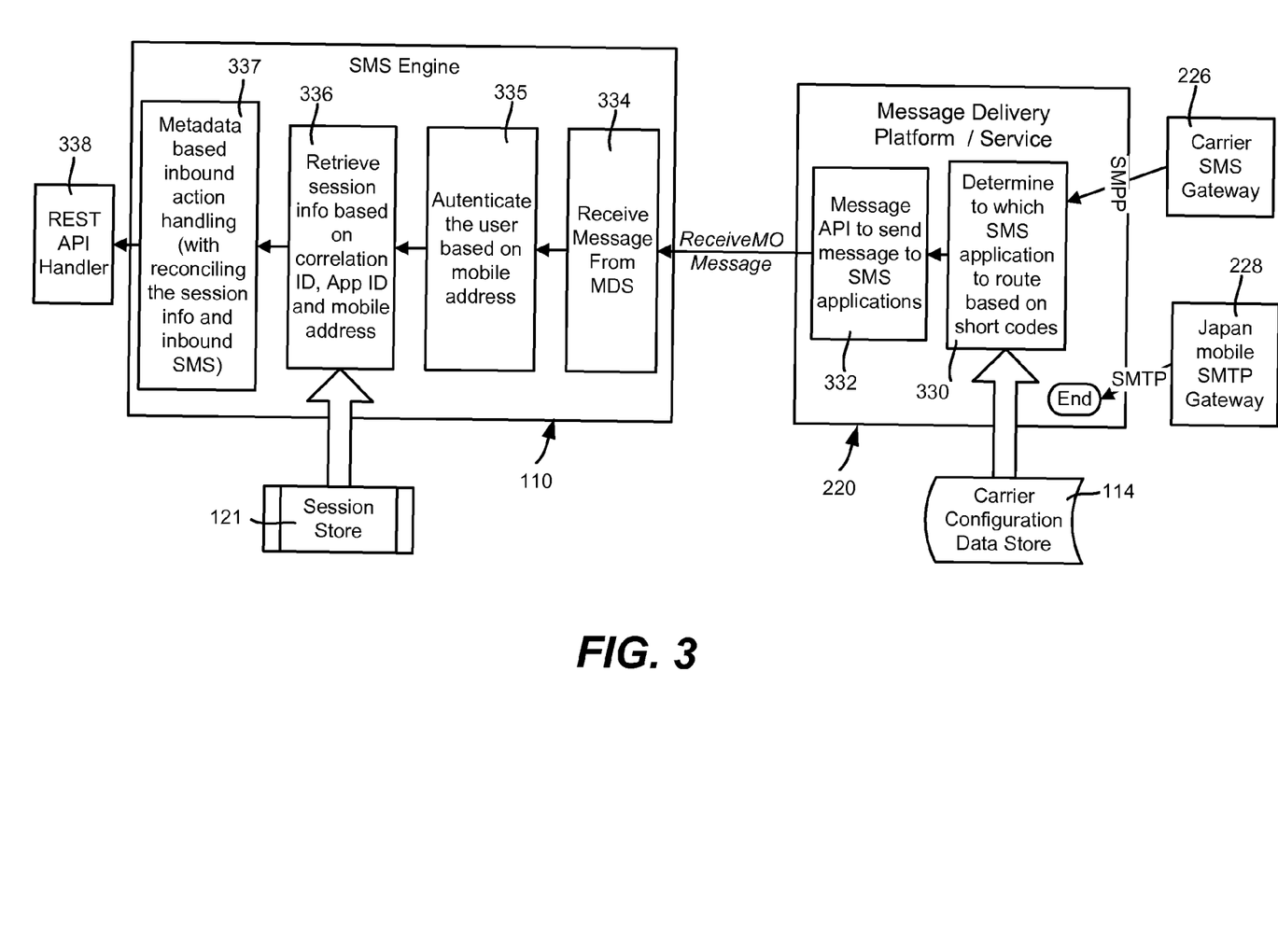
FIG. 3 is an example mobile messaging message processing pipeline that processes an incoming mobile messaging message reply related to a notification message.

Turning to inbound aspects of the pipeline as generally represented in FIG. 3, in general, if a user replies to the message, the reply is reconciled (combined) with the message data, and the combined data is delivered to an endpoint, e.g., of a set of REST API endpoints for each type of response supported, which is invoked when the response is processed. Note that in one implementation, only SMS (or MMS) inbound message processing is supported; processing of an inbound message with the email address as the mobile phone format is not supported, in which event the inbound message is discarded. Thus, the pipeline allows a user to send an SMS message with a command and get a response back, e.g., a two-way social notification message may be replied to with text or a particular command selection.

The tables below summarize example fields that may be related to the inbound message:

| ServiceEndpoint | |
| --- | --- |
| Field | Description |
| BaseUrl | Base URL of the service endpoint that mobile messaging message engine uses for making REST API call for inbound message handling. |
| AppendHeaders | The HTTP headers to append when making a REST API call for inbound message handling. |

| Actions | |
| --- | --- |
| Field | Description |
| Text | The text action means the entire inbound message is treated as parameter to pass into the REST API when calling Service endpoint. |
| CodedAction | Defines sets of localized command mapping with command (non-localized). The mobile messaging message engine parses the inbound message to get the command and uses it as command parameter to pass into the REST API when calling service endpoint. |

| CodedAction | |
| --- | --- |
| Field | Description |
| ServiceEndpoint | If this is present, it replaces the global ServiceEndpoint. |
| LocalizedCommandCode | The localized command code, which is used for matching user's response. Multiple localized command codes may map to one command. |
| Command | The command id of this coded command. |
| HasParameter | Tells the mobile messaging message engine that the notification response is with format "command parameter" or just "command". If the response expects the "command" only, but the response message contains more than "command" field, mobile messaging message engine treats the action not matching. Default is no parameter (if the field is not provided). |
| LocalizedReturnMessage | If not present, mobile messaging message engine does not return any message to user after processing the inbound. The LocalizedReturnMessage may have attributes: fromServer - to indicate the return message is from Service Endpoint API call if set to true oneway - indicate the return message is not expecting the user's response again if set to true expireSession - to expire the current session after getting successful response from Service Endpoint API call |

When the message delivery platform/service 220 receives an inbound SMS message from the carrier SMS gateway 226, the platform/service 220 determines the App ID and correlation identifier based on the "to" address of the SMS. This is represented in FIG. 3 by block 330, which may access the carrier configuration data store 114, and block 332, which represents routing the reply message to the mobile messaging message engine 110.

As represented by blocks 334-337, when the mobile messaging message engine 110 receives the message, the mobile messaging message engine 110 authenticates the user by looking up the identifier (e.g., PUID) based on the mobile address, and retrieves the session information based on the correlation identifier, mobile address and App ID from the session store 121. The mobile messaging message engine 110 reconciles the session information and inbound SMS to call a web service/application, e.g., the REST API handler 338, to complete the inbound handling.

In one implementation, the mobile messaging message engine 110 exposes a web service for receiving the message from the mobile delivery service/platform. The following data may be provided/retrieved:

| Column | Data Type | Comments |
| --- | --- | --- |
| Sender Mobile Address | String | The sender's mobile address(usually a phone number, but possibly may be an email address) |
| Message Body | String | The message text body |
| Application ID | Int | Application ID of SN Notification |
| Application Correlation ID | Int | Need if the mobile user initiated message is replying to the previous mobile terminated message with App or Correlation ID |

To authenticate a registered user, a database account that includes the mobile address-to-registered identifier (e.g., PUID) mapping is accessed. To retrieve the session information, the mobile messaging message engine 110 accesses the session information based on the App ID, correlation identifier and mobile address. More particularly, from the session info, the mobile messaging message engine retrieves the application name associated with the session, and reconciles the message body and the metadata-based actions in the session. The following information may be retrieved:

| Field | Description |
| --- | --- |
| ApplicationName | Application name of the caller, e.g. SNNotification. |
| Id | Identifier for the request, e.g., a GUID string used to track the request. |
| Locale | locale information of the notification message |

-continued

| Field | Description |
|---|---|
| Expiry | The expiry date and time of current request context |
| Scenario | Scenario value of the notification message |
| ServiceEndpoint | The service endpoint that mobile messaging message engine calls when receiving user's response |
| Context | The context data, which is passed to an API for inbound design |
| Actions | Specifies the expected actions from the inbound SMS |
| OnError | Specifies error handling if no action matches the expected actions |

In this manner, the mobile messaging message engine 110 obtains the actions metadata (e.g., defined in an XML schema). In one implementation, there are two types of action handling, namely text action handling and coded action handling, which may be mutually exclusive for each notification message. If neither is included in the actions, the mobile messaging message engine 110 treats the incoming message as being unable to be reconciled, and performs error handling.

If the text action is used, the mobile messaging message engine 110 considers the entire inbound SMS message as the text message.

If there is no text action included in the actions metadata, the mobile messaging message engine invokes a coded action parser. More particularly, the mobile messaging message engine trims any white space at beginning of the message, and checks whether the message body begins with any of localized command action defined in the coded action. If the coded action indicates that the command has no parameter, and the inbound message has additional text other than the localized command, the mobile messaging message engine treats the command as not matching. If the first localized command code is found, the mobile messaging message engine obtains the corresponding command value. If the coded action expects the parameter to be provided from the inbound SMS, the mobile messaging message engine 110 treats the rest of the message as the parameter.

If the response is a coded response, a unique code identifies the response. The code may be locale-sensitive, in which event the API call also specifies the locale for which the code is applicable, e.g., the market/locale associated with the user. Thus, when different users in different locales receive the otherwise same mobile messaging message, a different code can be used for the same coded response, due to the different locales. When the REST API is invoked, the REST API handler understands the intent of the response based on the locale-specific code. To simplify this, a locale-agnostic code is also included in the API and stored with the message metadata by the pipeline. The pipeline provides this code along with the user's locale to the REST API. This allows the mobile messaging message pipeline to be adapted to different markets while allowing incoming mobile messaging message processing to remain simple. After completing the action in the REST API, the pipeline can either return a standard message or depend on the REST API to return a localized message to the user.

The structure of the REST API follows a simple schema that can be used to support any type of mobile messaging message for any scenario. The message details include the message text, coded values if a coded response is received, the scenario for which the message was invoked, and a blob of data that can be anything submitted in the body of the outgoing API. This allows the REST API to receive contextual information useful in performing the REST API call. For example, for a Friend invitation to a user, the outgoing API may also include the CID of the inviting person. When a user accepts a friend request with an SMS reply such as with code value "a", the REST API is provided with the CID (along with the specific "a" value and the locale-agnostic "accept" value).

After parsing the inbound message action, the mobile messaging message engine 110 completes processing of the inbound notification by inbound action handling. Note that if no action is identified, the mobile messaging message engine performs an inbound notification error handling procedure to complete the inbound message processing.

To handle an inbound action, the mobile messaging message engine obtains the ServiceEndpoint associated with the parsed action (text action or specific command action) from the actions metadata. If there is no ServiceEndpoint element associated with the action, the mobile messaging message engine uses the global ServiceEndpoint from the session data.

The mobile messaging message engine 110 obtains a request URI the from the ServiceEndpoint for making the REST API request, which is the REST URI of the mobile messaging message engine's REST call from the BaseUrl element. The mobile messaging message engine 110 also may extract request headers from the AppendHeaders element.

The mobile messaging message engine 110 returns the message back to the user after making the REST API request. The mobile messaging message engine sends back the message according to the localized return message extracted from the session data.

Depending on the localized return message associated with the parsed action, the mobile messaging message engine may operate differently. If the localized return message element associated with the action is Null, the mobile messaging message engine determines that the caller does not expect the mobile messaging message engine to return any messages. If the fromServer parameter of the localized return message is set to false, the mobile messaging message engine sends the message with localized return message when the request succeeds. If the fromServer parameter of the localized return message is set to true, the mobile messaging message engine 110 uses the localized return message from the response to send out the message. If the request fails, the mobile messaging message engine sends a message from the returned localized message from the response.

Figure 4:
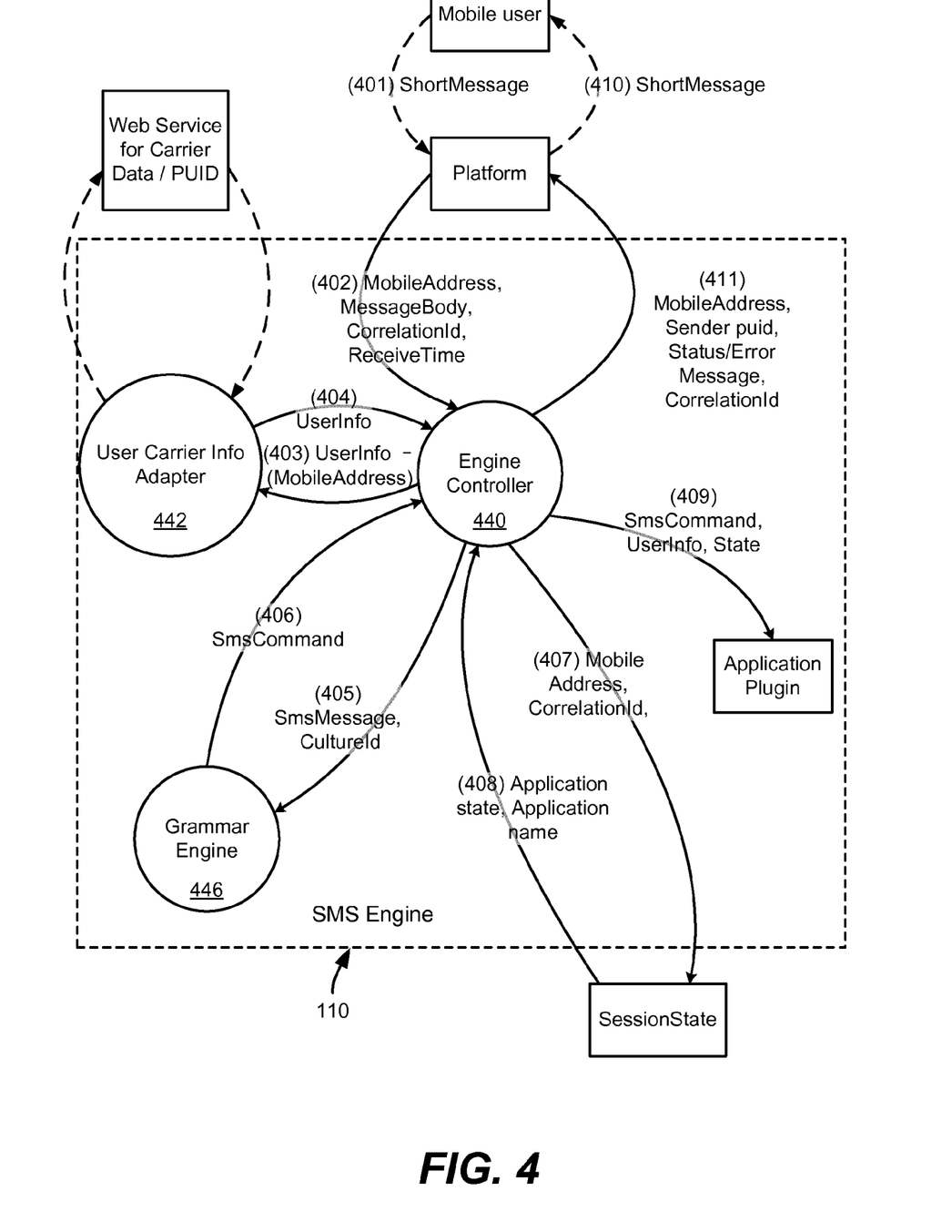
FIG. 4 is an example dataflow diagram showing a scenario in which a user initiates a message to a mobile messaging message engine of the pipeline or replies to a message which comes from the mobile messaging message engine.

By way of summary and additional details of the engine 110, FIG. 4 shows an example dataflow diagram corresponding to when a user sends a message a mobile device or the like to routing and delivery portion of the platform, beginning with step (401); note that the steps correspond to the labeled arrows. As described above, the information in the message includes mobile address, server address, and message body.

As represented by step (402), the MDS platform parses the server address to get the correlation identifier, then it calls engine (e.g., as a web service) with arguments comprising the mobile address, message body, correlation identifier and receive time. If the correlation identifier does not exist, zero is passed in as the correlation identifier.

As represented by step (403), an engine controller 440 (a component of the mobile messaging message engine 110) constructs user information from the mobile address and passes the information to a user and carrier information adapter 442 (another component of the mobile messaging message engine 110 in one implementation). At this time, this user information is incomplete, containing the mobile address but lacking a user identifier (e.g., PUID), carrier information and other (e.g., culture) information.

The adapter 442 fills in the other information by querying a web service or other data store, and returns (step (404)) the new user information, which contains the mobile address, user identifier, (e.g., PUID), carrier information and culture information to the controller 440. If the user information is missing the user identifier, (e.g., PUID), the controller returns an error message to the platform, described below with reference to step (410).

At step (405), the engine controller 440 passes the message body and culture information to a grammar engine 446, (another component of the mobile messaging message engine 110 in one implementation). The grammar engine 446 analyzes the message body and returns (step (406)) an SMS command, comprising a command identifier, command type, command string, application name and command message body.

If the command type is unknown and the correlation identifier is not zero, at step (407) the engine controller 440 queries the session state data with the mobile address and correlation identifier to get the application name and the state data that belongs to the application. At step (408), the application state and application name are returned from the session state data. If no data is returned, the SMS dispatching failed, whereby an error message is sent to mobile (or other device) user (step (410), described below).

As represented by step (409), the controller 440 finds the proper application plug-in by application name and passes the application state from the session state data, and the SMS command from the grammar engine, to an application plug-in. If there is no application state, null is passed in. At this time, the controller waits for a response from the application plug-in, as described below with reference to FIG. 5, where the application initiates a message and sends it to a mobile user or replies to the mobile command.

Step (410) represents sending the status/any error message to the platform. The arguments passed include the mobile address, sender's registered identifier (e.g., sender PUID), the error message and the correlation id; the sender's registered identifier and correlation identifier may be undefined.

Step (411) represents the platform sending the mobile messaging message to the mobile user. Note that messages may be checked with respect to business rules/a business engine (described below) before being sent out, (except one obtained from the business engine that warns when the mobile user's quota is exceeded). The business engine may determine if the message is allowed to be sent.

Figure 5:
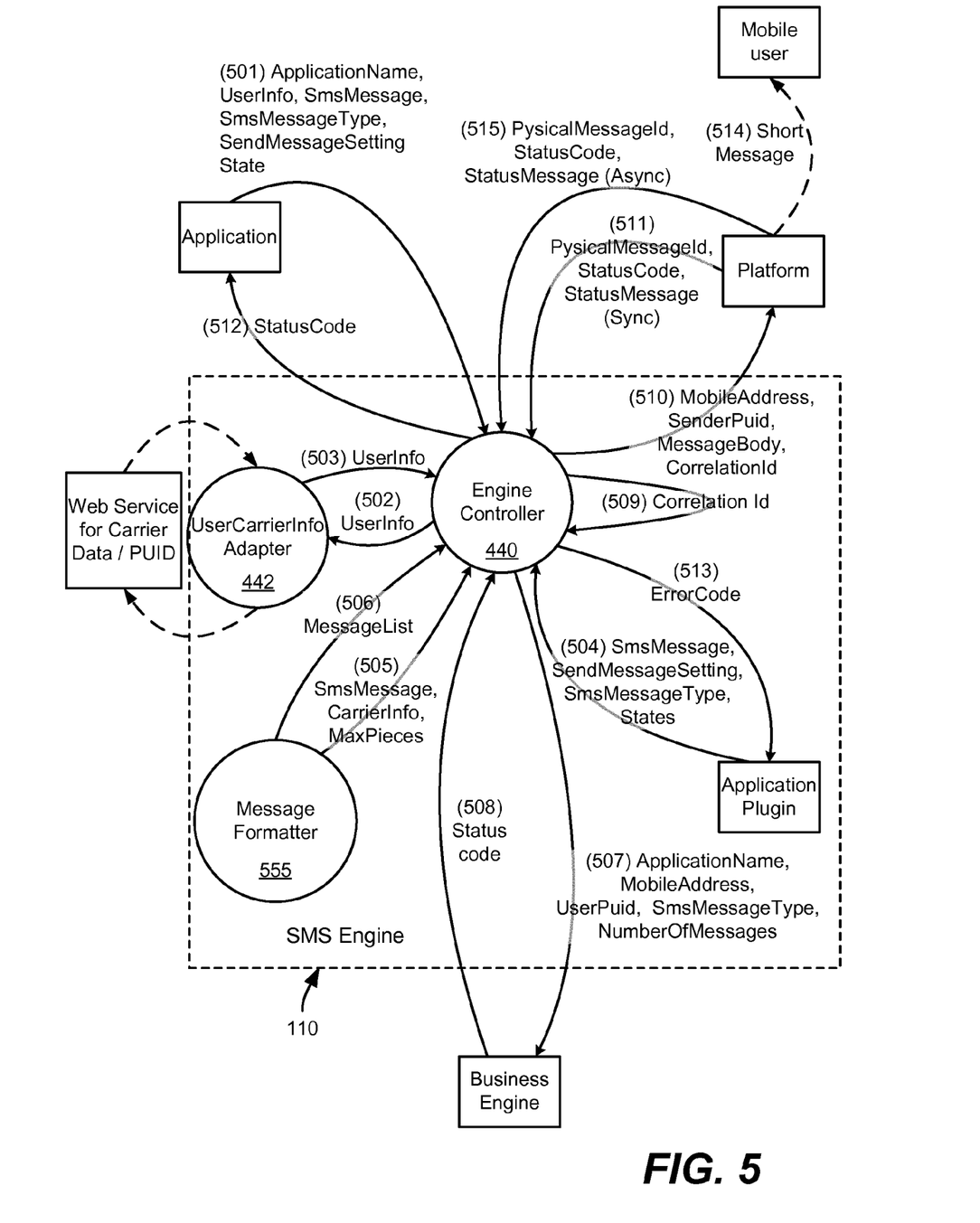
FIG. 5 is an example dataflow diagram showing a scenario in which an application initiates a message and sends it to a mobile user, or replies to a mobile command from a user initiated message or a message from the mobile messaging message engine.

FIG. 5 represents an example dataflow diagram in a scenario in which an application (e.g., on a personal computer or other computing device) initiates a message and sends it to mobile (or other device) user, or replies with a mobile command. At step (501), the application sends the message by calling an engine web service (e.g., via a simple object access protocol, or SOAP call), for example, providing the application's name, user information, message content, SmsMessageType, SendMessageSetting and state.

The engine controller 440 passes the user information, which contains partial information, to user and carrier information adapter 442. As generally described above, this user information may be not complete until processed and augmented by data obtained by the user and carrier information adapter 442. These steps are represented in FIG. 5 by the arrows labeled (502) and (503).

Note that as represented by step (504), the controller alternatively may receive a reply message from an application plug-in. This step is followed by step (409) of FIG. 4, and illustrates a situation in which the application plug-in returns a reply message after receiving a message from the mobile user. In this situation, the application name, user info, and original correlation identifier may already exist in the context. Thus, the application plug-in returns the message to be replied to the user, and provides the SmsMessageType, send message flag, and the application state; the application state is stored in the session state server.

As represented by steps (505) and (506), the controller 440 passes the message, carrier information and maximum number of message pieces (from either step (501) or step (504)) to a message formatting control component 555. The message formatting control component performs any message formatting, including any splitting, as described above, and returns the messages in a list or the like after any message splitting.

As mentioned above, a business engine may be used to check business rules with respect to each message; thus, at step (507), the controller 440 passes the application name, user identifier (e.g., PUID), mobile address, SmsMessageType and number of messages to the business engine. In turn, the business engine checks the message and at step (508) returns a status code indicative of the business rule check. In one implementation, included status codes may represent 1) Send Allowed; 2) Send Allowed, Send Quota Exceeded Message; 3) Send Quota Exceeded Message; 4) Carrier Not Supported, Message Quota Exceeded; 5) Application Not Supported, Carrier Not Supported; 6) Application Not Supported; 7) Anonymous Message Not Allowed, Message Quota Reached; or 8) Business Engine Internal Error Send Allowed, Send Quota Reached Message. Note that for status codes 2, 3 and 8, a "quota exceeded message" is sent. For a status code of 1 or 2, the message is sent.

As represented by step (509), the controller accesses the session state data to obtain the correlation identifier to send. In one implementation, the logic for obtaining the correlation identifier is determined by a SendMessageSetting enumerator, which may be Stateless, ReuseSession, or NewSession. If the SendMessageSetting equals Stateless, the correlation identifier is zero. If the SendMessageSetting equals ReuseSession and the current correlation identifier is zero, the correlation identifier is zero, which means a stateless message, otherwise the original correlation identifier of the message is used. If the SendMessageSetting equals NewSession, the next correlation identifier (just larger than the current) is used as the correlation identifier, which is then logged as the current correlation identifier. The next correlation identifier restarts at 1 if a larger value is out of the range of correlation ids for the current carrier.

At step 510, the messages are sent to the platform until the application has no more messages listed. In addition to the message body, the mobile address, user registered identifier (e.g., PUID) as the sender's registered identifier (e.g., sender PUID), for example, and correlation identifier are also sent.

As represented by step (511), the platform sends back a synchronized acknowledgement to the controller, which contains a physical message id, status code and status message.

The controller combines the synchronized acknowledgements into one, and returns a status (error) code to the application at step (512), or to the application plug-in at step (513), depending on whether the application initiated the message, or whether the message is a reply message sent by the application plug in, respectively.

At step (514), the platform sends the mobile messaging message to the mobile user. At step (515), the platform calls back to the engine to pass in a physical message id, status code and status message, asynchronously. The acknowledgements from this step and/or step (511) may be logged.

The pipeline tracks any errors via a REST endpoint similar to the other REST endpoints. This endpoint is capable of recording and logging errors such as unexpected SMS responses and providing timely reporting of the pipeline's functionality. The error configuration is also included in the API call, keeping the pipeline robust and capable of supporting multiple REST endpoints simultaneously.

EXEMPLARY OPERATING ENVIRONMENT

Figure 6:
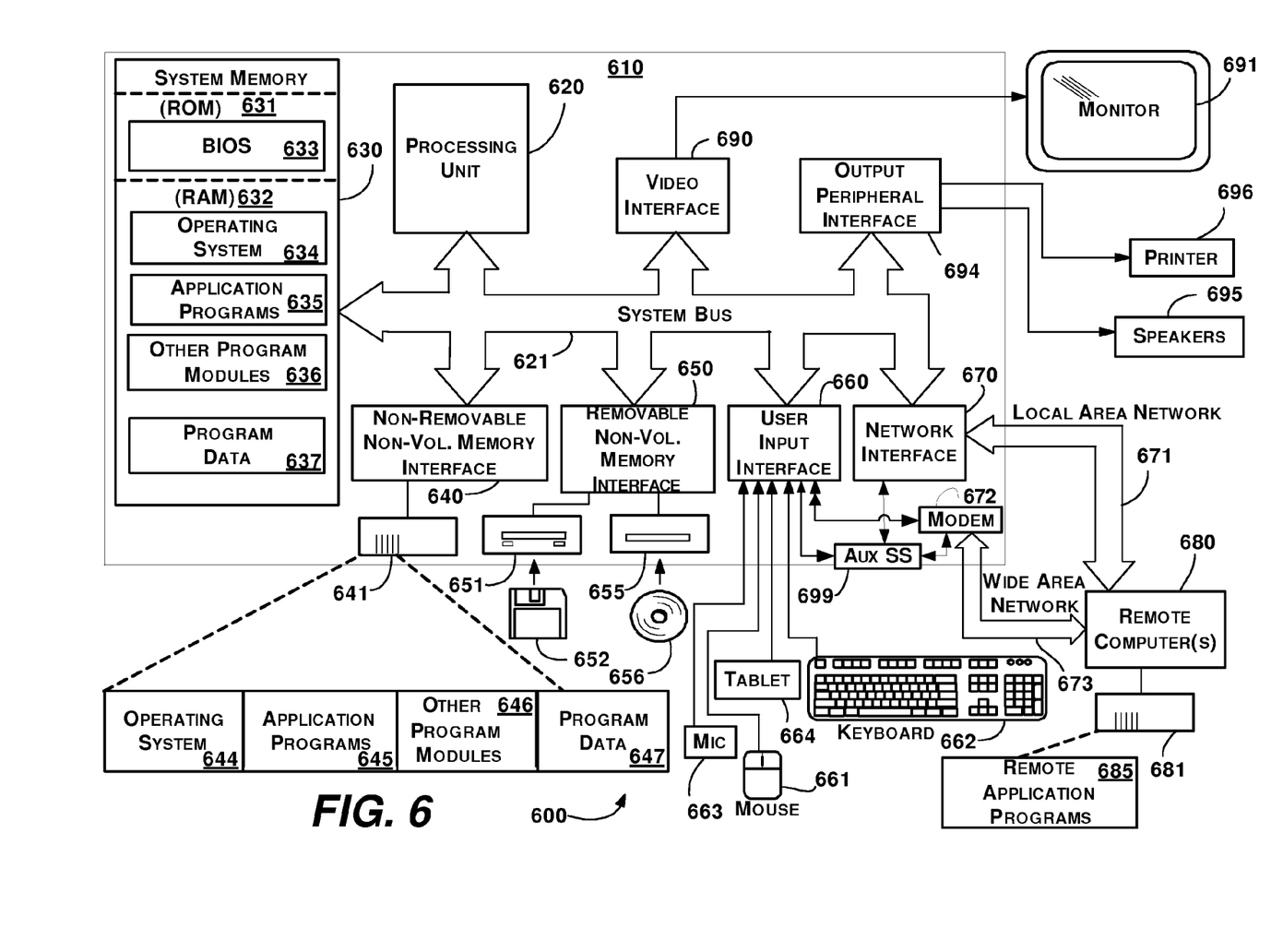
FIG. 6 shows an illustrative example of a computing environment into which various aspects of the present invention may be incorporated.

FIG. 6 illustrates an example of a suitable computing and networking environment 600 on which the examples of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during startup, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising:
one or more processors;
a notifications platform; and
an engine, implemented on the one or more processors, configured to receive a notification message from the notifications platform, the notification message comprising a request identifier, message content directed towards a mobile recipient, and data corresponding to one or more message processing instructions, the engine configured to access a carrier-related data store to determine information corresponding to a mobile address of the mobile recipient, and for a notification message for which a reply is possible, the engine configured to maintain state data by which a received reply is capable of being correlated with the notification message using the request identifier, wherein at least some of the state data is received from the notification sender and includes metadata that indicates at least one of text data or code data is expected in reply to the notification message, the engine further configured to receive a reply including at least one of the text data or the code data, to access the state data to correlate the reply with the notification message, and to send the reply to the notification sender based on the metadata.

2. The system of claim 1 wherein the notification message is received from a sender having an identifier that identifies a registered user of a notifications platform, and wherein the engine is configured to use the identifier to determine a mobile telephone number and carrier data of the sender.

3. The system of claim 1 wherein the engine comprises a web service accessed by an application programming interface (API) call from a notifications platform.

4. The system of claim 1 wherein the engine is further configured to transform the format of the notification message based on the information corresponding to the mobile address of the mobile recipient for transmission to the mobile recipient.

5. The system of claim 1 wherein the code data corresponds to a selected uniform resource locator (URL) of a plurality of URLs, and wherein the engine is configured to perform the action including by calling the selected URL.

6. The system of claim 1 wherein the code data includes a locale-specific code value, or a locale-agnostic code value, or both a locale-specific code value and a locale-agnostic code value.

7. The system of claim 1 wherein the information corresponding to a mobile address of the mobile recipient indicates that the message is to be sent to a Simple Mail Transfer Protocol (SMTP) recipient, or indicates that the message is to be sent to a Short Message Service (SMS) recipient.

8. The system of claim 1 wherein the engine is configured to format the notification message for the recipient, including shortening at least one uniform resource locator (URL) of the message into a shortened URL.

9. The system of claim 1 wherein the engine is configured to format the notification message for the recipient, including splitting the notification message into a plurality of shorter notification messages, or configured to handle an erroneous response from the recipient according to the metadata, or configured to both format the notification message for the recipient, including splitting the notification message into a plurality of shorter notification messages, and handle an erroneous response from the recipient according to the metadata.

10. In a computing environment, a method performed at least in part on at least one processor, comprising:

processing a notification message to be sent to a recipient as a mobile messaging message, including retrieving carrier-related data corresponding to a carrier of the recipient and a request identifier used to track the notification message;

maintaining state data associated with the notification message and the request identifier for use in correlating the notification message with any reply to the notification message, wherein the state data indicates that at least one of code data or text data is expected in the reply;

receiving a reply to the notification message; and based upon the state data, providing text content corresponding to the reply or performing an action based upon code data in the reply.

11. The method of claim 10 further comprising:

accessing the state data associated with the notification message; and using the state data to correlate the reply with the notification message.

12. The method of claim 10 wherein the code data includes at least one of a locale-specific code value or a locale-agnostic code value.

13. The method of claim 10 further comprising:

transforming the format of the notification message based on the carrier-related data for transmission to the recipient.

14. The method of claim 10 wherein performing the action comprises determining a uniform resource locator (URL) maintained in the state data based upon the code data, and calling the URL.

15. The method of claim 10 wherein processing the notification message comprises formatting the notification message, including shortening at least one uniform resource locator (URL) of the message into a shortened URL, or splitting the notification message into a plurality of shorter notification messages, or both shortening at least one URL of the message and splitting the notification message into a plurality of shorter notification messages.

16. One or more computer storage devices having computer-executable instructions, which in response to execution by a computer, cause the computer to perform steps comprising:

processing a notification message directed towards to a mobile messaging message recipient, including accessing a carrier-related data store to determine information corresponding to a mobile address of the mobile messaging message recipient, providing an identifier for the notification message, and maintaining state data of the notification message in which the state data is referenced by the identifier, wherein the state data includes information indicating that any reply to the notification message is expected to contain at least one of text data or code data; and processing a reply to the notification message, in which the reply includes the identifier as metadata, including accessing the state data based on the identifier, and, based on the state data, performing an action or providing text content to the initiator of the notification message.

17. The one or more computer storage devices of claim 16 wherein processing the notification message further comprises transforming the format of the notification message based on the information corresponding to a mobile address of the mobile messaging message recipient.

18. The one or more computer storage devices of claim 16 wherein performing the action comprises calling a uniform resource locator (URL) based on the code data in the reply.

19. The one or more computer storage devices of claim 16 wherein processing the notification message comprises formatting the notification message, including shortening at least one uniform resource locator (URL) of the message into a shortened URL, or splitting the notification message into a plurality of shorter notification messages, or both shortening at least one URL of the message into data representative of that URL and splitting the notification message into a plurality of shorter notification messages.

20. The one or more computer storage devices of claim 16 wherein the code data includes at least one of a locale-specific code value or a locale-agnostic code value.

* * * * *